United States Patent Office 3,470,270
Patented Sept. 30, 1969

3,470,270
PRODUCTION OF PHOSPHORUS ACID ESTERS
Ruben Wardi, 88 Hatishbi St., Haifa, Israel
No Drawing. Continuation-in-part of application Ser. No. 251,734, Jan. 16, 1963. This application Nov. 24, 1965, Ser. No. 509,612
Claims priority, application Israel, Jan. 28, 1962, 16,686
Int. Cl. C07f 9/08; C09k 3/00
U.S. Cl. 260—926                                          7 Claims

ABSTRACT OF THE DISCLOSURE

Preparation of acid esters of phosphorus by contacting white phosphorus and a hydrocarbon having one alcoholic hydroxyl group, with oxygen supplied by a stream of air in a reaction medium of ethyl acetate or butyl acetate at a temperature of 20° C. to 55° C. The process produces a novel mixture of acid esters in which the average oxidation state of phosphorus is from 3.9 to 4.1. These esters can be used as emulsifiers, fuel additives, metal complexing agents, flotation agents, extreme pressure lubricant additives, and rust inhibitors.

---

This application is a continuation-in-part of my abandoned application Ser. No. 251,734 filed on Jan. 16, 1963.

It is an object of the present invention to provide a novel method for the preparation of organo-phosphorus compounds.

It is a further object of the present invention to provide a process for the direct reaction of white phosphorus, oxygen provided as a stream of air, and an organic hydrocarbon compound having at least one alcoholic hydroxy group to result in a composition of organo-phosphorus compounds of an average oxidation state of phosphorus of about 4. This corresponds statistically to the composition of dialkyl dihydrogen hypophosphates as regards the oxidation of phosphorus, the acid number and the ratio of phosphorus to alkyl groups.

It is a further object of the present invention to provide a method for the production of organo-phosphorus compounds in high yields and substantially without undesired byproducts or residues by reacting white phosphorus, oxygen provided in a stream of air and an organic compound having at least one alcoholic hydroxy group in a specific reaction medium.

It is yet a further object of the present invention to provide compositions of organo-phosphorus compounds which can be advantageously used as surface active agents, emulsifiers, flotation agents, fuel additives, lubricant additives, corrosion inhibitors, metal complexing agents and the like.

Other and further objects of the present invention will become apparent hereinafter.

A reaction of white phosphorus, an excess of alkanol which serves both as reactant and also as reaction medium, and pure oxygen, is known to give a comparatively low yield of dialkyl phosphites. One of the drawbacks of this known method is the fact that it is quite dangerous since reactants are bound to react quite violently, resulting even in an explosion. In contrast to this known method, the method according to the present invention, which is effected in a specific reaction medium as set out hereinafter, is entirely safe, easily controlled, and gives different compositions of matter.

The novel process according to the present invention comprises reacting white phosphorus with an organic compound having at least one hydroxy group in a suitable reaction medium, with oxygen provided as a stream of air, at a temperature in the range of between about 20 to 55° C., and preferably between about 30–45° C., until substantially all the phosphorus is reacted, and removing the reaction medium. The rate of the reaction is easily controlled by the rate air passes through the reaction medium. The temperature is controlled so as to remain in the desired range, and if necessary by external cooling.

The choice of the reaction medium is of considerable importance. In principle there may be used any suitable non-aqueous reaction medium which is a solvent for the organic compound bearing the hydroxy function and for the products of the reaction, and in which white phosphorus and oxygen are at least slightly soluble. The medium should not undergo any substantial changes during the course of the reaction and should be recoverable at the end of the reaction. Lower alkyl esters, such as ethyl acetate and butyl acetate are preferred media of reaction. Ethyl acetate is advantageous because of its low cost, whereas butyl acetate can be more easily recovered because of its higher boiling point.

As already pointed out, the presence of the reaction medium renders the reaction easily controllable and safe. Carrying out the reaction in a medium such as butyl acetate has further unexpected advantages. While the reaction between a given alcohol, white phosphorus and pure oxygen at about 30° C. is extremely slow and gives rise to undesirable byproducts, a reaction at a useful rate will take place at the same temperature in butyl acetate as the reaction medium and with a stream of air instead of a stream of oxygen.

The rate of reaction can be easily controlled by controlling the rate of introduction of air. The other reactants can be admixed with each other at the start of the reaction or they may be added gradually during the reaction. It is preferred to prepare a suspension of the phosphorus in the reaction medium, to add the alcohol during the reaction and to control the rate of the reaction by means of the supply of air.

The preferred ratio of the reactants is one gram atom of phosphorus per gram molecule of the compound bearing the hydroxy group. The reaction is continued until substantially all the phosphorus has undergone reaction.

With this ratio of reactants a substantially complete conversion of the phosphorus into organo-phosphorus compounds is attained. The product of the reaction is of rather complex nature. Its analysis corresponds statistically to that of diesters of hypophosphorus acid as regards the state of oxidation of the phosphorus, acid number and ratio of alkyl groups to phosphorus. Up to date analytical methods, such as measurements of nuclear magnetic resonance provide further information about its composition. Such measurements have shown that the reaction product comprises acid esters of phosphorus acids of an average oxidation state of phosphorus of about 4 (from about 3.9 to about 4.1), containing mainly monoalkyl phosphite, mono- and dialkyl phosphate, alkyl pyrophosphate, and alkyl isohypophosphate. These products of reactions can be considered to be products of hydrolysis and alcoholysis of a hitherto unknown substance, namely hypophosphoric anhydride, $P_4O_8$.

The products of reaction were examined by conventional methods of analysis, which gave the above indicated results, and also by the method of measurement of nuclear magnetic resonance (NMR), which provides information about the links of the atom which is being examined. The NMR spectra of phosphorus and of hydrogen were examined.

The NMR spectrum of phosphorus shows the presence of the following species (the chemical shifts are with respect to 85% $H_3PO_4$):

(a) Pentavalent phosphorus, with chemical shifts of from +2 to −2 p.p.m., assigned to esters of phosphoric acid;

(b) Trivalent phosphorous (linked to hydrogen), with chemical shifts of from −5 p.p.m. and a splitting due to the P-H bond of about 650 c.p.s., assigned to esters of phosphorous acid;

(c) Pentavadlent phosphorus linked to another phosphorus atom via oxygen, with a chemical shift of about +12 p.p.m., assigned to esters of pyrophosphoric and isohypophosphoric acid;

(d) Trivalent phosphorus linked to hydrogen and to another phosphorus atom via oxygen, with a chemical shift of about 750 c.p.s., assigned to esters of pyrophosphorous acid or isohypophosphoric acid.

The hydrogen NMR spectrum confirmed the P-H bond assignment and provided further information as to the type of esters (neutral, acid), present in the reaction product.

The state of oxydation of phosphorous indicates the number of bonds of a phosphorous atom in a molecule with electro-negative elements, such as oxygen or with a halogen, diminished by the number of bonds with electropositive elements, e.g. hydrogen, sodium or carbon. Thus the state of oxidation of phosphorous in phosphoric acid, $H_3PO_4$ is five, in phosphorous acid, $H_3PO_3$, it is three, in phosphine, $PH_3$ it is minus 3; in elemental phosphorus it is zero. The term "average oxidation state" refers to the numerical average of the oxidation state of phosphorus in a mixture of phosphorus compounds.

The average state of oxidation of the products of reaction obtained according to the present invention was determined by hydrolysis followed by oxidation. A weighed quantity of the reaction produced was first examined by conventional methods as to its content of phosphorous. A further weighed quantity was refluxed in 4 N hydrochloric acid for one hour and after cooling the mixture was neutralized with sodium hydroxide and buffered with sodium bicarbonate. A measured amount of n/10 iodine solution sufficient for a complete oxidation of the phosphorous present was added and the mixture was allowed to stand at ambient temperature for 45 minutes. The excess of iodine was back-titrated with thiosulfate. From the amount of iodine reduced by the substance under test and from its total content of phosphorus, the state of oxidation can be readily calculated.

The products of reaction obtained according to the present invention have an average oxidation state of phosphorus of about 4. The exact value varies from about 3.9 to about 4.1.

The compositions obtained according to the present invention can be neutralized with suitable organic or inorganic bases and the reaction products can also be reacted with alkylene oxides. The products thus obtained are useful as emulsifiers and for similar purposes.

The process according to the present invention can be conveniently carried out with technical grade reactants and with ordinary air.

If the process is carried out under strictly anhydrous conditions, a larger proportion of compounds containing two phosphorus atoms per molecule is obtained. The NMR spectrum of phosphorus indicates in this case the presence of isohypophosphate and pyrophosphate esters as major components. When water is added to this product of reaction, it is converted into a composition as obtained from technical grade reactants and atmospheric air. This was verified by measurements of the NMR spectrum after the hydrolysis.

A fuller and better understanding of the invention may be obtained by referring to the following examples and claims, which examples are to be construed in a non-limitative manner. It should be clearly understood that although results of analysis are indicated with reference to compositions corresponding statistically to diesters of hypophosphoric acid, the compositions obtained are of a rather more complex nature.

EXAMPLE 1

A reaction vessel was equipped with an efficient stirrer, a dropping funnel, a thermometer, an inlet tube for air and a reflux condenser, the outlet of which was connected by glass-tubing through an empty 10 liter bottle to an efficient cold-trap cooled by means of dry ice and acetone; means being provided for measuring the quantity of air passed into the reaction vessel and the quantity of gases leaving through the cold trap.

The reaction vessel was charged with 300 g. ethyl acetate, and a quantity of 40 g. molten white phosphorus was run in with vigorous stirring, resulting in a fine dispersion of the phosphorus in the reaction medium. The reaction vessel was immersed in a water bath through which cold water was passed and a quantity of 168 g. n-octyl alcohol was gradually added during three and a half hours, while a steady stream of air of 45 liters/hour (NTP) was bubbled through and the temperature was maintained in the range between 28 to 32° C. by external cooling. Dense white fumes were evolved and the fumes leaving the reaction vessel were precipitated in the ten-liter bottle and in the cold trap. The quantity of the outflowing gas remained steady at 37.5 liters/hour during 3 hours and 45 minutes (NTP), at which time the absorption of oxygen ceased and no more fumes were formed. The flow of air was maintained for a further 15 minutes. A clear, colorless liquid was obtained. The contents of the traps were united with the content of the reaction vessel and the solvent was removed by distillation under reduced pressure. There was obtained 236 g. of a clear, oily and nearly colorless liquid. The analysis of the reaction product corresponds statistically to the composition of di-n-octyl dihydrogen hypophosphate.

Calculated for $C_{16}H_{36}P_2O_6$: P, 16.0%; C, 49.7%; acid number 290. Found: P, 15.5%; C, 49.7%; acid number 276.

The average oxidation state of phosphorus was found to be 3.94.

EXAMPLE 2

A run was carried out as in Example 1, with 240 g. lauryl alcohol (technical grade dodecyl alcohol) instead of n-octyl alcohol. After removal of the solvent by distillation, 315 g. of an oily, clear and nearly colorless liquid was obtained. The composition of this reaction product corresponds statistically to the composition of di-lauryl dihydrogen hypophosphate as regards the oxidation state of phosphorus, acid number and the ratio of alkyl to phosphorus. Measurements of nuclear magnetic resonance show the reaction mixture to be of rather complicated composition.

Calculated for $C_{24}H_{52}P_2O_6$: P, 12.4%; C, 57.7%; acid number 225. Found: P, 12.0%; C, 56.8%; acid number 216.

The average oxidation state of phosphorus was 3.92.

EXAMPLE 3

A reaction vessel as used in Example 1 was charged with 500 g. ethyl acetate, into which 80 g. of white phosphorus were run in with vigorous stirring. A quantity of 336 g. 2-ethylhexyl alcohol was introduced gradually during seven hours, while a steady stream of air of 45 liters per hour (NTP) was passed through the reaction mixture which was maintained at a temperature between 25–35° C. The quantity of outflowing gases was nearly steady at 37.5 liters/hour (NTP) during eight hours, during which time the reaction was completed, so that no unreacted phosphorus remained. The solvent was distilled off under reduced pressure and 490 of a clear, oily and nearly colorless liquid was obtained. The analysis of this reaction product corresponds statistically to the composition of di-2-ethylhexyl dihydrogen hypophosphate, although its actual composition is quite complicated.

Calculated for $C_{16}H_{36}P_2O_6$: P, 16.0%; C, 49.7%; acid number 290. Found: P, 15.3%; C, 49.4%; acid number 286.

The average oxidation state of phosphorus was 4.02.

A further run was carried out, but with 500 g. n-butyl acetate as reaction medium instead of the ethyl acetate. A stream of air was passed through the reaction mixture at a rate of 50 liters/hour (NTP) for 8 hours and the temperature was maintained between 45 and 50° C. by external cooling. After distillation of the butyl acetate 508 g. of a clear oily liquid remained.

Calculated for $C_{16}H_{36}P_2O_6$: P, 16.0%; C, 49.7%; acid number 290. Found: P, 14.6%; C, 50.1%; acid number 294.

Average oxidation state of phosphorus: 4.08.

EXAMPLE 4

A run was carried out as in Example 1, but with 170 g. technical oleyl alcohol (consisting of about 70% by weight octadecenyl alcohol and 30% by weight cetyl alcohol), the total quantity of white phosphorus used being 20 g. The oleyl alcohol was introduced into the reaction vessel at the beginning of the reaction, together with the inert reaction medium. After distilling off the solvent, 210 g. of an oily, clear, slightly yellowish liquid was obtained.

Acid number, calculated for the above mixture of alcohols: 171.5. Found: 182.

EXAMPLE 5

A run was carried out as in Example 1, but instead of octyl alcohol, 96 g. of tert-butyl alcohol was used. After removal of the solvent by distillation at reduced pressure, 174 g. of a clear almost colorless liquid was obtained, the analysis of which corresponds statistically to that of di-tert-butyl dihydrogen hypophosphate.

Calculated for $C_8H_{20}P_2O_6$: P, 22.6%; C, 35.0%. Found: P, 22.5%; C, 34.1%.

EXAMPLE 6

A run was carried out as in Example 1, but with 140 g. benzyl alcohol instead of the octyl alcohol. The temperature was maintained between 20–30° C. during the reaction by means of external cooling. After removing the reaction medium by distillation, 217 g. of a clear, almost colorless liquid was obtained. The analysis of the reaction product corresponds statistically to the composition of di-benzyl dihydrogen hypophosphate.

Calculated for $C_{14}H_{16}P_2O_6$: P, 18.7%; C, 49.1%; acid number 328. Found: P, 18.1%; C, 48.7%; acid number 318.

EXAMPLE 7

A run was carried out as in Example 1, but with 130 g. cyclohexanol instead of the octyl alcohol, and with butyl acetate instead of ethyl acetate. The temperature was maintained during the reaction between 25–30° C. by external cooling. After removal of the butyl acetate by distillation, 206 g. of a clear oily and slightly colored liquid was obtained, the analysis of which corresponds statistically to that of di-cyclohexyl dihydrogen hypophosphate.

Calculated for $C_{12}H_{24}P_2O_6$: P, 19.0%; C, 44.2%; acid number 344. Found: P, 18.4%; C, 43.9%; acid number 335.

EXAMPLE 8

To 20 g. of the composition obtained in Example 3, there was added with constant stirring 16.5 g. of a 25% (by weight) solution of sodium hydroxide. After the cooling of the reaction product to ambient temperature, 36 g. of a soft paste was obtained, which contained 62% of the organophosphorus compounds, the rest being water. 6.5 g. of this paste were dissolved in 1 liter of hard tap water. The pH of the solution was 6.7.

The wetting time of a standard cotton wick as determined by the Draves-Clarkson Test with a 1.5 g. hook was 29 seconds. For comparison a solution of Turkish-red-oil in the same tap water, containing 4 g. per liter of sodium sulforicinate, gave a wetting time of 129 seconds by the same test.

EXAMPLE 9

A quantity of 13 g. triethanolamine was added slowly and with constant stirring to 20 g. of the composition obtained in Example 3, and a soft paste was obtained after cooling of the product.

A solution of 4 g. of this paste in 1 liter of hard tap water had a pH of 6.85. When tested by the Draves-Clarkson Test, as in Example 8, the wetting time was 31 seconds.

EXAMPLE 10

Ethylene oxide gas was passed through a solution of 20 g. of the composition obtained in Example 1 in 100 ml. ethyl acetate at 50° C. After removal of the solvent by distillation, 32 g. of a slightly turbid, viscous liquid was obtained.

A solution of 4 g. of the product thus obtained, in 1 liter hard tap water, gave a wetting time of 42 seconds when tested as in Example 8.

EXAMPLE 11

A quantity of 5 g. of the composition obtained in Example 2 was mixed with 95 g. of kerosine, containing about 15% aromatic compounds. A clear solution was obtained. 10 ml. of this solution were mixed with 90 ml. of hard tap water, resulting in an emulsion which did not show any separation after 24 hours.

EXAMPLE 12

Polished strips of mild steel were dipped into the emulsion obtained in Example 11 and allowed to dry. Other strips of mild steel were dipped into kerosine and water. The strips dipped into the emulsion remained bright after exposure during 7 days, while the control strips showed severe rusting after 24 hours.

EXAMPLE 13

The property of the compositions obtained according to the present invention to form complexes, and their use for extracting heavy metal ions from aqueous solutions was tested as follows:

An acidic aqueous solution, 0.4 molar calculated on uranium ion and 0.05 molar calculated on sulfuric acid, was prepared by dissolving appropriate quantities of uranyl nitrate hexahydrate and sulfuric acid in distilled water. A solution of 1.93 g. of the composition obtained in Example 3 in purified kerosine, so as to result in 100 ml. of solution, was prepared. Equal volumes of the two solutions were shaken during 10 minutes in a separatory funnel and then allowed to separate. The separation resulted in an aqueous and an organic layer. The distribution coefficient for uranyl ion between the organic and the aqueous phase was 220.

EXAMPLE 14

Extreme pressure lubrication tests were carried out in a four-ball machine using a medium viscosity mineral oil and a heavy mineral oil. When 1 percent by weight of the composition obtained in Example 2 was added to the mineral oils, the load carrying capacity as determined by the size of the wear spot, was increased 4 to 9 times over that of the mineral oil without the additives.

What is claimed is:

1. A process for the preparation of acid esters of phosphorus having an average oxidation state of 3.9 to 4.1 which comprises contacting and reacting white phosphorus and a hydrocarbon having an alcoholic hydroxy group with oxygen supplied in a stream of air in a reaction medium of ethyl acetate or butyl acetate at a temperature of 20° C. to 55° C. until substantially all of the phosphorus has reacted, and wherein about one gram atom of phosphorus is provided in the reaction medium for each gram molecule of said hydroxy compound.

2. A process of claim 1 wherein the hydroxy compound is added gradually during the reaction.

3. A process of claim 1 wherein the reaction medium is ethyl acetate.

4. A process of claim 1 wherein the reaction medium is butyl acetate.

5. A process of claim 1 wherein the hydroxy compound is tertiary butyl alcohol, cyclohexyl alcohol, benzyl alcohol octyl alcohol, 2-ethylhexyl alcohol, lauryl alcohol or oleyl alcohol.

6. A process of caim 1 wherein the reactants are provided in a substantially anhydrous state and the process is carried out under anhydrous conditions.

7. A mixture of acid esters of phosphorus having an average oxidation state of 3.9 to 4.1 having as the main constituents monoalkyl phosphite, mono- and dialkyl phosphate, alkyl pyrophosphate and alkyl isohypophosphate obtained by the process of claim 1.

References Cited
UNITED STATES PATENTS 2,661,364   12/1953   Ernsberger et al. _____ 260—971

CHARLES B. PARKER, Primary Examiner

R. L. RAYMOND, Assistant Examiner

U.S. Cl. X.R.

252—351, 396, 49.8, 60; 260—933, 971